United States Patent
Mate et al.

(10) Patent No.: US 11,318,988 B2
(45) Date of Patent: May 3, 2022

(54) HYDRAULIC STEERING CONTROL SYSTEM

(71) Applicant: Caterpillar Inc., Deerfield, IL (US)

(72) Inventors: Edward W. Mate, Manhattan, IL (US); John R. Connolly, Clayton, NC (US)

(73) Assignee: Caterpillar Inc., Peoria, IL (US)

( * ) Notice: Subject to any disclaimer, the term of this patent is extended or adjusted under 35 U.S.C. 154(b) by 771 days.

(21) Appl. No.: 16/247,056

(22) Filed: Jan. 14, 2019

(65) Prior Publication Data

US 2020/0223476 A1 Jul. 16, 2020

(51) Int. Cl.
*B62D 5/06* (2006.01)
*B62D 5/087* (2006.01)

(52) U.S. Cl.
CPC ............. *B62D 5/062* (2013.01); *B62D 5/087* (2013.01)

(58) Field of Classification Search
CPC ................................. B62D 5/062; B62D 5/087
See application file for complete search history.

(56) References Cited

U.S. PATENT DOCUMENTS

| | | |
|---|---|---|
| 3,902,401 A | 9/1975 | Allen et al. |
| 4,240,457 A | 12/1980 | Riediger |
| 4,914,913 A | 4/1990 | St. Germain et al. |
| 7,306,071 B2 | 12/2007 | Harnischfeger et al. |
| 9,248,854 B2 * | 2/2016 | Belshan ................... B62D 5/30 |
| 9,840,273 B2 | 12/2017 | Sullivan et al. |
| 9,878,737 B2 | 1/2018 | McIlheran et al. |
| 2017/0072998 A1 | 3/2017 | Krahn |
| 2018/0281852 A1 * | 10/2018 | Eagles ................... B62D 5/093 |
| 2021/0164196 A1 * | 6/2021 | Mizutani ............... B60T 17/221 |

FOREIGN PATENT DOCUMENTS

| | | | |
|---|---|---|---|
| CN | 105134695 B2 | 10/2017 | |
| DE | 3616041 A1 | 5/1986 | |
| DE | 102014010174 A1 | 1/2015 | |
| JP | 08207808 A * | 8/1996 | ............. B62D 12/00 |

* cited by examiner

*Primary Examiner* — Kevin Hurley
(74) *Attorney, Agent, or Firm* — von Briesen & Roper, s.c.

(57) ABSTRACT

An autonomous steering control unit for a hydraulic steering control system has a pilot selector valve, primary and secondary electro-hydraulic (EH) steering valves, and an output selector valve. In a primary autonomous steering mode, the primary EH steering valve operates to output pilot fluid from the pilot selector valve through the output selector valve to the steering control system to control steering of a work machine while the pilot selector valve and the output selector valve isolate the secondary EH steering valve from the steering control system. In a secondary autonomous steering mode, the secondary EH steering valve operates to output pilot fluid through the output selector valve to the steering control system while the primary EH steering valve is isolated from the steering control system. In alternative embodiments, a load sense selector valve alternately connects an dynamic load sense line to the operative steering valve.

20 Claims, 6 Drawing Sheets

HYDRAULIC STEERING CONTROL SYSTEM

TECHNICAL FIELD

The present disclosure relates generally to work machines and, more particularly, to hydraulic steering control systems in work machines.

BACKGROUND

Work machines utilize electro-hydraulic steering control systems to take advantage of the versatility of such systems over purely mechanical and hydraulic steering systems. Some work machines may include a manually operated mechanical or hydraulic steering system and an integrated electro-hydraulic steering control system as a redundant steering system or as an alternative autonomous steering system. In electro-hydraulic steering systems, hydraulic power provides the muscle for the actual steering function via hydraulic components, while electrical components provide commands for precision control of the hydraulic components. The redundant or autonomous electro-hydraulic steering system may be implemented in concert with a primary mechanical or hydraulic steering system in order to take over control of the hydraulic components of the work machine when necessary.

An example of an electro-hydraulic steering system is disclosed in U.S. Pat. Appl. Publ. No. 2017/0072998, entitled, "Load-Reaction Switching Valve Assembly." In the reference, a steering system for a vehicle includes a fluid pump, an actuator in selective fluid communication with the fluid pump, a hydrostatic steering system and an electro-hydraulic steering system. The hydrostatic steering system includes a fluid controller having a first proportional valve in fluid communication with the fluid pump and a fluid meter in fluid communication with the first proportional valve and the actuator. The electro-hydraulic steering system includes a second proportional valve in selective fluid communication with the fluid pump and the actuator. The second proportional valve is disposed in parallel to the first proportional valve. The electro-hydraulic steering circuit further includes a load-reaction switching valve assembly disposed in series with the first proportional valve of the hydrostatic steering system. The load-reaction switching valve allows fluid communication between the actuator and the fluid controller when the first proportional valve is in a neutral position.

SUMMARY OF THE DISCLOSURE

In one aspect of the present disclosure, an autonomous steering control unit for a hydraulic steering control system for a work machine is disclosed. The hydraulic steering control system has a primary pilot line, a secondary pilot line, a first autonomous pilot fluid line and a second autonomous pilot fluid line. The autonomous steering control unit may include a pilot selector valve fluidly connected to the secondary pilot line and a return line to a fluid reservoir, a primary electro-hydraulic (EH) steering valve fluidly connected to the primary pilot line and the return line, a secondary EH steering valve fluidly connected to the pilot selector valve and the return line, and an output selector valve fluidly connected to the primary EH steering valve, the secondary EH steering valve, the first autonomous pilot fluid line and the second autonomous pilot fluid line. In a primary autonomous steering mode of the autonomous steering control unit, the pilot selector valve is biased to a primary steering valve position where the secondary pilot line is fluidly connected to the return line, the output selector valve is biased to a primary pilot fluid output position where the primary EH steering valve is fluidly connected to the first autonomous pilot fluid line and the second autonomous pilot fluid line, and the primary EH steering valve is actuatable between a primary valve neutral position where the primary pilot line is blocked and the first autonomous pilot fluid line and the second autonomous pilot fluid line are fluidly connected to the return line, a primary valve first turn position where the primary pilot line is fluidly connected to the first autonomous pilot fluid line, and a primary valve second turn position where the primary pilot line is fluidly connected to the second autonomous pilot fluid line. In a secondary autonomous steering mode of the autonomous steering control unit, the pilot selector valve is actuated to a secondary steering valve position where the secondary pilot line is fluidly connected to the secondary EH steering valve, the output selector valve is forced by fluid from the secondary pilot line to a secondary pilot fluid output position where the secondary EH steering valve is fluidly connected to the first autonomous pilot fluid line and the second autonomous pilot fluid line, and the secondary EH steering valve is actuatable between a secondary valve neutral position where the secondary pilot line is blocked and the first autonomous pilot fluid line and the second autonomous pilot fluid line are fluidly connected to the return line, a secondary valve first turn position where the secondary pilot line is fluidly connected to the first autonomous pilot fluid line and the second autonomous pilot fluid line is fluidly connected to the return line, and a secondary valve second turn position where the secondary pilot line is fluidly connected to the second autonomous pilot fluid line.

In another aspect of the present disclosure, an autonomous steering control unit for a hydraulic steering control system for a work machine is disclosed. The hydraulic steering control system has a primary pilot line, a secondary pilot line, a first autonomous pilot fluid line and a second autonomous pilot fluid line. The autonomous steering control unit may include a primary pilot selector valve fluidly connected to the primary pilot line and a return line to a fluid reservoir, a primary EH steering valve fluidly connected to the pilot selector valve and the return line, a secondary EH steering valve fluidly connected to the secondary pilot line and the return line, and an output selector valve fluidly connected to the primary EH steering valve, the secondary EH steering valve, the first autonomous pilot fluid line and the second autonomous pilot fluid line. In a primary autonomous steering mode of the autonomous steering control unit, the primary pilot selector valve is actuated to a primary steering valve enable position where the primary pilot line is fluidly connected to the primary EH steering valve, the output selector valve is forced by fluid from the primary pilot line to a primary pilot fluid output position where the primary EH steering valve is fluidly connected to the first autonomous pilot fluid line and the second autonomous pilot fluid line, and the primary EH steering valve is actuatable between a primary valve neutral position where the primary pilot line is blocked and the first autonomous pilot fluid line and the second autonomous pilot fluid line are fluidly connected to the return line, a primary valve first turn position where the primary pilot line is fluidly connected to the first autonomous pilot fluid line, and a primary valve second turn position where the primary pilot line is fluidly connected to the second autonomous pilot fluid line. In a secondary autonomous steering mode of the autonomous steering control unit, the primary pilot selector valve is biased to a primary steering valve disable position where the primary pilot line is fluidly connected to the return line, the output selector valve is biased to a secondary pilot fluid output position where the secondary EH steering valve is fluidly connected to the first autonomous pilot fluid line and the second autonomous pilot fluid line, and the secondary EH steering valve is actuatable between a secondary valve neutral position where the secondary pilot line is blocked and the first autonomous pilot fluid line and the second autonomous pilot fluid line are fluidly connected to the return line, a secondary valve first turn position where the secondary pilot line is fluidly connected to the first autonomous pilot fluid line and the second autonomous pilot fluid line is fluidly connected to the return line, and a secondary valve second turn position where the secondary pilot line is fluidly connected to the second autonomous pilot fluid line.

In a further aspect of the present disclosure, an autonomous steering control unit for a hydraulic steering control system for a work machine is disclosed. The hydraulic steering control system has a pilot supply line, a load sense line, a first autonomous pilot fluid line and a second autonomous pilot fluid line. The autonomous steering control unit may include a pilot selector valve fluidly connected to the pilot supply line and a return line to a fluid reservoir, a load sense selector valve fluidly connected to the load sense line, a primary EH steering valve fluidly connected to the load sense selector valve, the pilot supply line and the return line, a secondary EH steering valve fluidly connected to the load sense selector valve, the pilot selector valve and the return line, and an output selector valve fluidly connected to the primary EH steering valve, the secondary EH steering valve, the first autonomous pilot fluid line and the second autonomous pilot fluid line. In a primary autonomous steering mode of the autonomous steering control unit, the pilot selector valve is biased to a primary steering valve position where the pilot supply line is not fluidly connected to the secondary EH steering valve, the load sense selector valve is biased to a primary load sense fluid output position where the load sense line is fluidly connected to the primary EH steering valve and is not fluidly connected to the secondary EH steering valve, the output selector valve is biased to a primary pilot fluid output position where the primary EH steering valve is fluidly connected to the first autonomous pilot fluid line and the second autonomous pilot fluid line, and the primary EH steering valve is actuatable between a primary valve neutral position where the pilot supply line is blocked and the first autonomous pilot fluid line, the second autonomous pilot fluid line and the load sense line are fluidly connected to the return line, a primary valve first turn position where the load sense line is fluidly connected to the pilot supply line and the pilot supply line is fluidly connected to the first autonomous pilot fluid line, and a primary valve second turn position where the load sense line is fluidly connected to the pilot supply line and the pilot supply line is fluidly connected to the second autonomous pilot fluid line. In a secondary autonomous steering mode of the autonomous steering control unit, the pilot selector valve is actuated to a secondary steering valve position where the pilot supply line is fluidly connected to the secondary EH steering valve, the load sense selector valve is forced by fluid from the pilot supply line to a secondary load sense fluid output position where the load sense line is fluidly connected to the secondary EH steering valve and is not fluidly connected to the primary EH steering valve, the output selector valve is forced by fluid from the pilot supply line to a secondary pilot fluid output position where the secondary EH steering valve is fluidly connected to the first autonomous pilot fluid line and the second autonomous pilot fluid line, and the secondary EH steering valve is actuatable between a secondary valve neutral position where the pilot supply line is blocked and the first autonomous pilot fluid line and the second autonomous pilot fluid line are fluidly connected to the return line, a secondary valve first turn position where the load sense line is fluidly connected to the pilot supply line and the pilot supply line is fluidly connected to the first autonomous pilot fluid line, and a secondary valve second turn position where the load sense line is fluidly connected to the pilot supply line and the pilot supply line is fluidly connected to the second autonomous pilot fluid line.

Additional aspects are defined by the claims of this patent.

DETAILED DESCRIPTION

Figure 1:
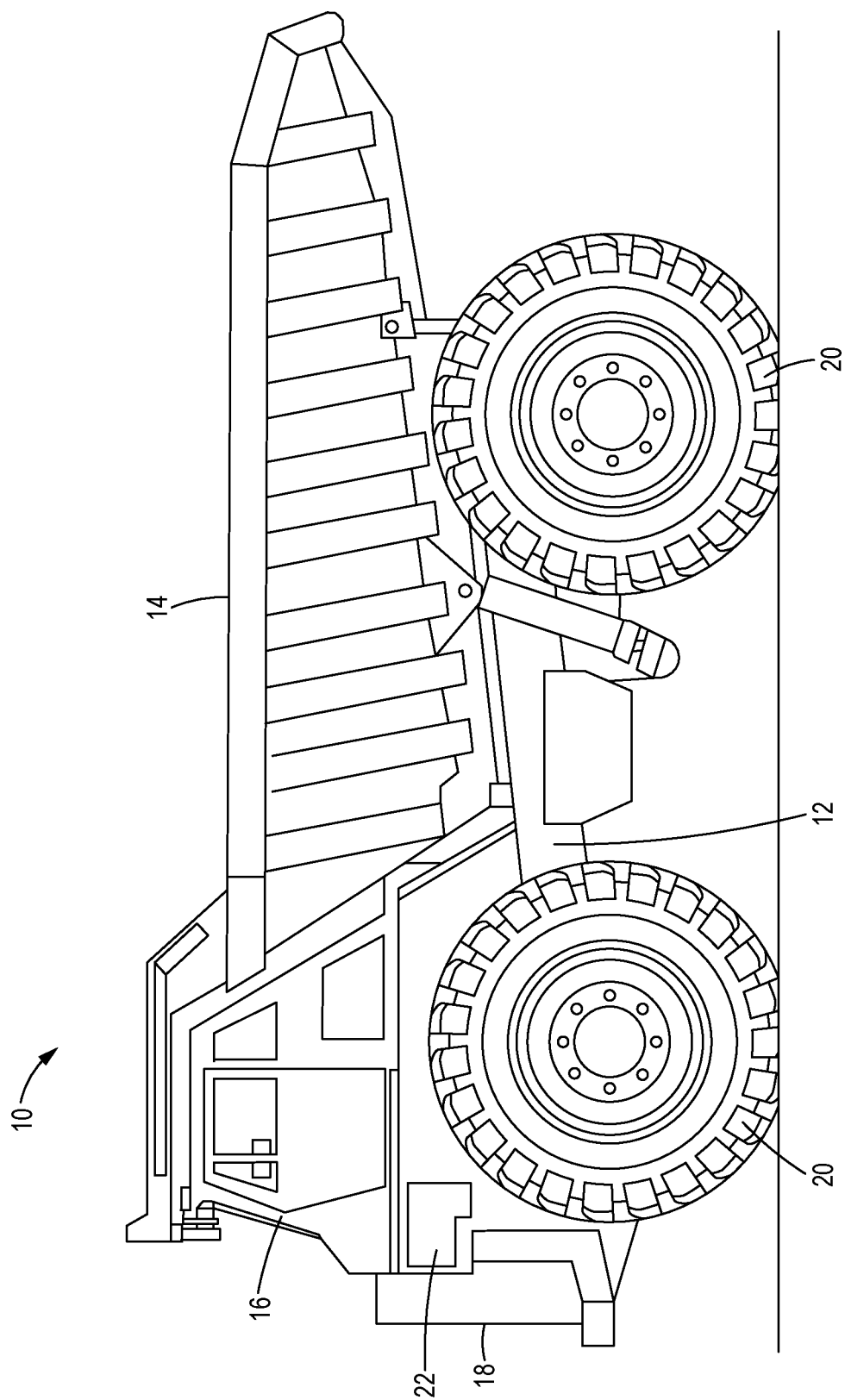
FIG. 1 is a side view of a work machine in which hydraulic steering control systems in accordance with the present disclosure may be implemented.

FIG. 1 illustrates an exemplary work machine 10 in which hydraulic steering control including autonomous steering in accordance with the present disclosure may be implemented. As illustrated, the work machine 10 may be embodied as a mining truck. In various other aspects, the work machine 10 may be an off-highway truck, a dozer, a motor grader, a wheel loader or any other machine which may perform various operations associated with an industry such as mining, construction, farming, transportation, or any other industry known in the art. The work machine 10 may include a frame 12 and a payload carrier 14 pivotally supported on the frame 12. An operator cab 16 may be mounted to the frame 12, such as above an engine enclosure 18 and on a front part of the frame 12, and may have operator controls including a steering input device (not shown) such as a steering wheel, joy sticks, a tiller and the like for an operator to manipulate to steer the work machine 10 when the work machine 10 is in the manual steering mode. The operator cab 16 may further include a steering mode selection input device (not shown) that may allow an operator to select between the manual steering mode and the autonomous steering mode of the work machine 10.

The work machine 10 may be supported on the ground by a plurality of ground engaging members 20, such as wheels, with the front ground engaging members 20, for example, being able to turn in either direction to steer the work machine 10. One or more power sources 22 may be housed within the engine enclosure 18 and provide power to one or more onboard operational systems, such as a cooling system, a drive system, a steering system, a hoist system, a tool system, a lubrication system and the like. The power source 22 may be a diesel engine, a gasoline engine, a gaseous fuel-powered engine, a hydrogen-powered engine, or any other type of combustion engine known in the art. Alternatively, the power source 22 may be a non-combustion source of power such as a fuel cell, a power storage device, a solar cell, or another suitable source of power. The power source 22 may produce mechanical and/or electrical power output, which may be converted to hydraulic power in the form of pressurized fluid.

Figure 2:
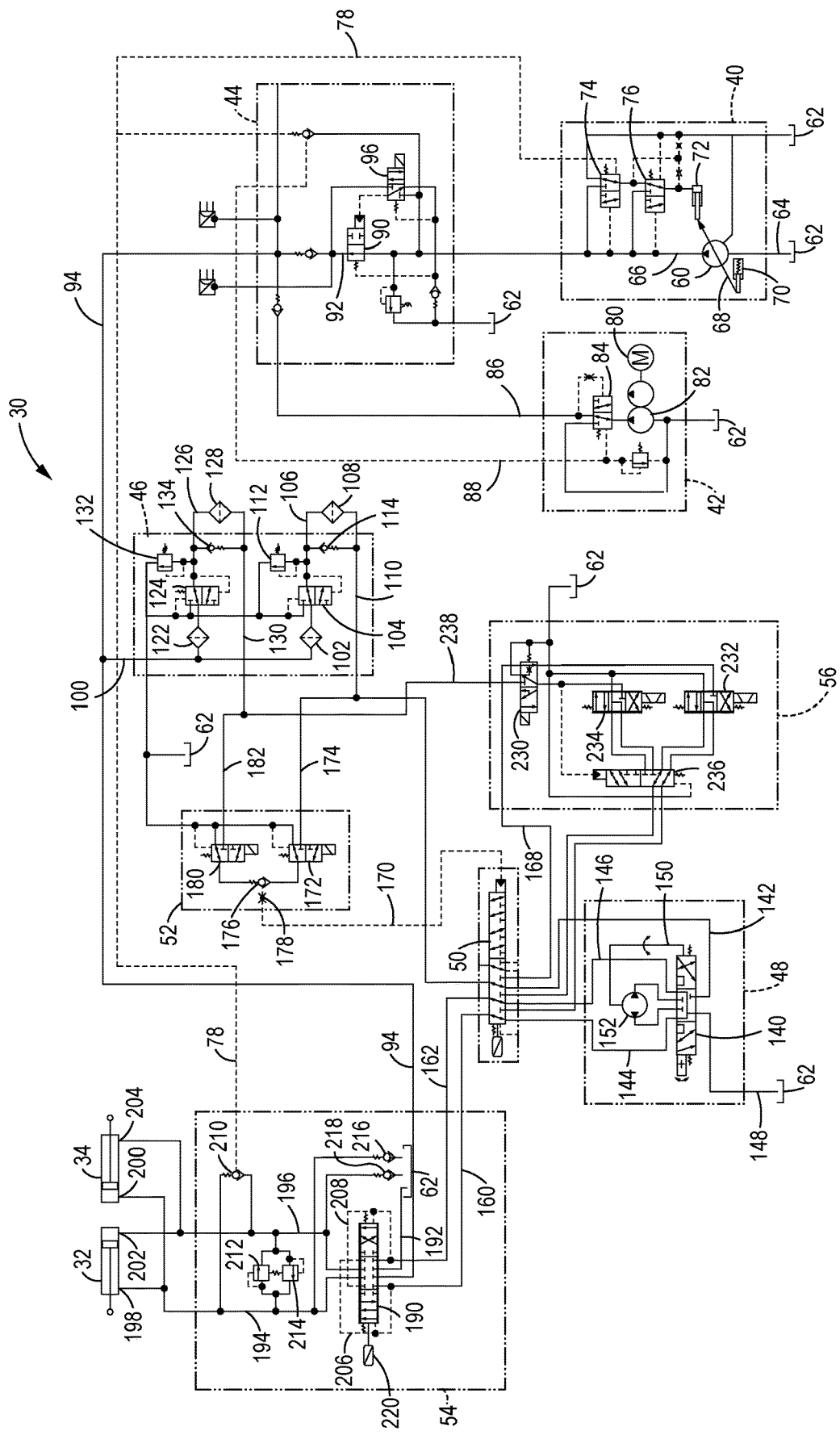
FIG. 2 is a schematic diagram of an embodiment of a hydraulic steering control system in accordance with the present disclosure of the work machine of FIG. 1.

Referring to FIG. 2, an embodiment of a hydraulic steering control system 30 for the work machine 10 may control movement of a first double acting steering cylinder 32 and a second double acting steering cylinder 34 that are operatively connected to corresponding ground engaging members 20 to steer the work machine 10. The illustrated hydraulic steering control system 30 is configured to control manual steering performed by an operator from the operator cab 16, or to control autonomous steering of the work machine 10 that may be controlled by an electronic control module (not shown) of the work machine 10 or from a remote location. Methods for executing an autonomous steering strategy are known in the art. The hydraulic steering control system 30 of the illustrated embodiment includes a primary steering fluid supply unit 40, a secondary steering fluid supply unit 42, a steering disable unit 44, a pilot supply unit 46, a human or manual steering control or metering unit (HMU) 48, an autonomous selector valve 50, a steering mode selector unit 52, a steering flow amplifier unit 54, and an autonomous steering control unit 56.

The primary steering fluid supply unit 40 is the primary source of pressurized steering fluid and pilot fluid for the hydraulic steering control system 30 and may include a primary pump 60 that is mechanically connected to an output shaft (not shown) of the power source 22. The power source 22 may drive the primary pump 60 via the output shaft to draw in low-pressure fluid from a fluid reservoir such as a tank 62 via a primary pump inlet line 64 and discharge the fluid at an elevated pressure in a primary pump discharge line 66. In an exemplary embodiment, the primary pump 60 may embody a rotary or piston-driven pump having a crankshaft (not shown) connected to the power source 22 via the output shaft such that rotation of the output shaft results in corresponding pumping motion of the primary pump 60. The primary pump 60 may be a unidirectional, variable-displacement hydraulic pump equipped with a stroke-adjusting mechanism 68, for example a swash plate, a position of which can be hydro-mechanically adjusted by pump output control cylinders 70, 72 based on, among other things, a load sense pressure of fluid in the steering flow amplifier unit 54.

The first pump output control cylinder 70 may be spring biased to move the swash plate 68 to a high pump output position, and the second pump output control cylinder 72 may be extendable when pressurized fluid is communicated to the head end to rotate the swash plate 68 against the biasing force of the first pump output control cylinder 70 to decrease the steering fluid output of the primary pump 60. In an arrangement known in the art, a pair of supply pressure regulator valves 74, 76 communicate a variable amount of steering fluid to the second pump output control cylinder 72 based on a pressure differential between the primary pump discharge line 66 and a load sense line 78 from the steering flow amplifier unit 54 that is indicative of a fluid pressure of steering fluid provided to the steering cylinders 32, 34. When low pressure at the steering cylinders 32, 34 is indicated by the load sense line 78, the supply pressure regulator valves 74, 76 open to connect the second pump output control cylinder 72 to the tank 62 so the first pump output control cylinder 70 can force the swash plate 68 toward the high pump output position and increase the fluid output of the primary pump 60. During pressure spikes or other increases in the load sense line 78, the supply pressure regulator valves 74, 76 provide steering fluid to the second pump output control cylinder 72 and rotate the swash plate 68 to reduce the fluid pressure to the steering cylinders 32, 34.

The secondary steering fluid supply unit 42 is capable of providing pressurized steering fluid if the primary pump 60 is disabled, and may include an electric motor 80 driving a secondary pump 82 that draws low-pressure fluid from the tank 62. The secondary pump 82 discharges the fluid at an elevated pressure through a secondary supply pressure regulator valve 84 and into a secondary pump discharge line 86. The secondary supply pressure regulator valve 84 as illustrated is configured to use a pressure differential between the secondary pump discharge line 86 and a secondary load sense line 88 to vary the fluid flow and fluid pressure output to the secondary pump discharge line 86.

The pump discharge lines 66, 86 are combined at the steering disable unit 44 prior to being output to the remainder of the hydraulic steering control system 30. At the steering disable unit 44, the primary pump discharge line 66 is connected at an inlet of a primary fluid supply cutoff valve 90, and a cut off valve outlet line 92 connects to the secondary pump discharge line 86 to feed into a main steering fluid supply line 94 providing steering fluid to the steering flow amplifier unit 54. The primary fluid supply cutoff valve 90 is spring biased to a normal open position to fluidly connect the primary pump discharge line 66 to the main steering fluid supply line 94. A solenoid actuated steering disable control valve 96 is also connected between the primary pump discharge line 66 and the cut off valve outlet line 92. Under normal operating conditions, the steering disable control valve 96 is spring biased to an operational position with flow from the primary pump discharge line 66 blocked and a pilot end of the primary fluid supply cutoff valve 90 connected to the tank 62. When flow from the primary steering fluid supply unit 40 is to be disabled, the solenoid of the steering disable control valve 96 is energized to cause the steering disable control valve 96 to move to a disable position where the primary pump discharge line 66 is fluidly connected to the pilot end of the primary fluid supply cutoff valve 90 to move the primary fluid supply cutoff valve 90 to a cutoff position where the fluid connection between the primary pump discharge line 66 and the cut off valve outlet line 92 is blocked and the cut off valve outlet line 92 is connected to the tank 62 to drain. At this point, the secondary steering fluid supply unit 42, if operational, can supply steering fluid to the main steering fluid supply line 94.

The pilot supply unit 46 functions to take steering fluid from the main steering fluid supply line 94 and reduce the pressure to a specified pilot pressure for use in controlling the operation of the steering flow amplifier unit 54. Steering fluid is diverted from the main steering fluid supply line 94 through a pilot supply line 100 to primary and secondary pilot supply loops. In the primary pilot supply loop, steering fluid passes through a primary inlet filter 102 to a primary pilot supply valve 104. The primary pilot supply valve 104 is also fluidly connected to the tank 62 and to a primary pilot supply valve outlet line 106 that is also connected to a primary outlet filter 108 that may be accessible for maintenance and replacement. The outlet of the primary outlet filter 108 is connected to a primary pilot pressure line 110. The primary pilot supply valve 104 may be biased by a variable force spring to an open position fluidly connecting the filters 102, 108. The fluid pressure output to the primary pilot supply valve outlet line 106 may be used as feedback to the primary pilot supply valve 104 acting against the spring force to ensure pilot fluid is output at a desired reduced pressure. A primary shock relief valve 112 fluidly connects primary pilot supply valve outlet line 106 to the tank 62 and opens to prevent damage to the components during pressure spikes. A primary bypass check valve 114 fluidly connecting the primary pilot supply valve outlet line 106 to the primary pilot pressure line 110 may open during less severe pressure increases, such as due to fouling of the primary outlet filter 108, to deliver pilot fluid to the primary pilot pressure line 110 until the cause of the pressure increase can be corrected. The secondary pilot supply loop includes a secondary inlet filter 122, a secondary pilot supply valve 124, a secondary pilot supply valve outlet line 126, a secondary outlet filter 128, a secondary pilot pressure line 130, a secondary shock relief valve 132 and a primary bypass check valve 134 functioning in a similar manner as the corresponding components of the primary pilot supply loop to provide redundancy and a constant supply of pilot fluid.

The HMU 48 as illustrated may include a steering control valve 140 fluidly connected to the primary pilot pressure line 110 through the autonomous selector valve 50 by a manual pilot supply line 142. A first manual pilot line 144 and a second manual pilot line 146 fluidly connect the steering control valve 140 to the autonomous selector valve 50. A return line 148 fluidly connects the steering control valve 140 to the tank 62. A spool of the steering control valve 140 is moveable from a neutral position to either a first turn position or a second turn position. In either of the turn positions, the steering control valve 140 establishes a flow path between the manual pilot supply line 142 and the respective first manual pilot line 144 and the second manual pilot line 146. A steering command input device (not shown) such as a steering wheel, joysticks, tiller or the like may be conventionally connected to the spool of the steering control valve 140 via a linkage assembly 150 for moving the spool between the neutral position and the turn positions in response to displacement of the steering command input device by an operator in the operator cab 16. A metering mechanism 152 may be provided for directing a regulated volume of pressurized pilot fluid from the manual pilot supply line 142 through the steering control valve 140 and into the respective manual pilot line 144, 146 when the steering control valve 140 is moved to one of the turn positions. The metering mechanism 152 can be, for example, a gerotor metering mechanism connected to the steering input device by means of the linkage assembly 150.

At the neutral position of the steering control valve 140, the manual pilot lines 144, 146 are connected by the return line 148 to the tank 62, and the manual pilot supply line 142 and the metering mechanism 152 are blocked from the other lines and ports. With the steering control valve 140 moved leftward as illustrated to the first turn position in response to movement of the steering input device, the manual pilot supply line 142 is in fluid communication with one port of the metering mechanism 152 and the other port of the metering mechanism 152 is in fluid communication with the first manual pilot line 144, while the second manual pilot line 146 is in fluid communication with the tank 62 via the return line 148. Similarly, with the steering control valve 140 moved rightward to the second turn position in response to movement of the steering input device, the manual pilot supply line 142 is in fluid communication with other port of the metering mechanism 152 and the one port of the metering mechanism 152 is in fluid communication with the second manual pilot line 146, and the first manual pilot line 144 is in fluid communication with the tank 62 via the return line 148. Those skilled in the art will understand that the configuration of the HMU 48 is exemplary, and other mechanisms for converting an operator steering input into signals in the manual pilot lines 144, 146 indicating a steering direction and speed are contemplated by the inventors as having use in hydraulic steering control systems in accordance with the present disclosure.

The autonomous selector valve 50 in the present embodiment is a two-position pilot valve that alternately fluidly connects the HMU 48 and the autonomous steering control unit 56 to the steering flow amplifier unit 54. The autonomous selector valve 50 is spring biased to the manual steering position shown in FIG. 2. In the manual steering position, the primary pilot pressure line 110 from the pilot supply unit 46 is fluidly connected to the manual pilot supply line 142 to provide pilot fluid to the HMU 48, and the manual pilot lines 144, 146 are fluidly connected to a first amplifier pilot fluid line 160 and a second amplifier pilot fluid line 162 to transfer metered pilot fluid between the HMU 48 and the steering flow amplifier unit 54. At the same time, a first autonomous pilot fluid line 164, a second autonomous pilot fluid line 166 and an autonomous steering primary pilot line 168 of the autonomous steering control unit 56 are blocked. When the work machine 10 switches from the manual steering mode to the autonomous steering mode, the steering mode selector unit 52 outputs a pilot signal to the autonomous selector valve 50 via an autonomous selector valve pilot passage 170 to cause the autonomous selector valve 50 to move to an autonomous steering position in which the primary pilot pressure line 110 is fluidly connected to the autonomous steering primary pilot line 168 to provide a primary source of pilot fluid to the autonomous steering control unit 56, and the autonomous pilot fluid lines 164, 166 are fluidly connected to amplifier pilot fluid lines 160, 162, respectively, to transfer pilot fluid between the autonomous steering control unit 56 and the steering flow amplifier unit 54.

The steering mode selector unit 52 uses the pilot fluid from the pilot supply unit 46 to generate the pilot signal output in the autonomous selector valve pilot passage 170. The steering mode selector unit 52 may include a primary steering mode selector valve 172 fluidly connected to the primary pilot pressure line 110 by a primary selector valve inlet line 174 and to the autonomous selector valve pilot passage 170 by a two-way check valve 176. The primary steering mode selector valve 172 is spring biased to a closed position, and solenoid operated when the work machine 10 is switched to the autonomous steering mode to move to an open position and fluidly connect the primary selector valve inlet line 174 to the two-way check valve 176. The pilot fluid from the two-way check valve 176 passes through an orifice 178 to output the pilot signal to move the autonomous selector valve 50 to the autonomous steering position. Redundancy is provided in the steering mode selector unit 52 by a secondary steering mode selector valve 180 that is arranged and operates in a similar manner as the primary steering mode selector valve 172 to fluidly connect a secondary selector valve inlet line 182 from the secondary pilot pressure line 130 to the two-way check valve 176. Fault detection methods such as those known in the art may be used to detect failure in the primary steering mode selector valve 172 and cause control signals to be transmitted to the secondary steering mode selector valve 180 to operate to provide the pilot signal to the autonomous selector valve 50.

The steering flow amplifier unit 54 will operate in the same manner in either the manual steering mode or the autonomous steering mode. The illustrated steering flow amplifier unit 54 includes a directional control valve 190 that is fluidly connected to the HMU 48 and the autonomous steering control unit 56 by the autonomous selector valve 50 and the amplifier pilot fluid lines 160, 162 to receive the pilot fluid. The directional control valve 190 also has the main steering fluid supply line 94 connected at an inlet port to receive pressurized steering fluid from the steering fluid supply units 40, 42, and is fluidly connected to the tank 62 by a return line 192. A first steering cylinder conduit 194 and a second steering cylinder conduit 196 fluidly connect the directional control valve 190 to the steering cylinders 32, 34. The first steering cylinder conduit 194 is connected to first turn ports 198, 200 of the steering cylinders 32, 34, respectively, so that pressurized steering fluid in the first steering cylinder conduit 194 will cause the steering cylinders 32, 34 to move to turn the ground engaging members 20 in the first turn direction. Similarly, the second steering cylinder conduit 196 is connected to second turn ports 202, 204 of the steering cylinders 32, 34, respectively, so that pressurized steering fluid in the second steering cylinder conduit 196 will cause the steering cylinders 32, 34 to move to turn the ground engaging members 20 in the second turn direction. A first pilot signal passage 206 and a second pilot signal passage 208 from the amplifier pilot fluid lines 160, 162, respectively, provide pilot signals to opposite ends of a spool of the directional control valve 190 and are also connected to pilot drain ports of the directional control valve 190 to drain pilot fluid as discussed further below.

The fluid pressures in the steering cylinder conduits 194, 196 may be used to control the operation of the steering fluid supply units 40, 42 to provide a desired pressure and flow of steering fluid to the steering cylinders 32, 34 and within the other units of the hydraulic steering control system 30. In the illustrated embodiment, the steering cylinder conduits 194, 196 are connected to the load sense line 78 by a two-way check valve 210. Steering fluid can flow from one or the other of the steering cylinder conduits 194, 196 to the load sense line 78 depending on which steering cylinder conduit 194, 196 has the greater fluid pressure. The steering fluid from the steering cylinder conduits 194, 196 is communicated through the load sense line 78 as a static load sense signal back to the supply pressure regulator valves 74, 84 to act against the fluid pressures from the pump discharge lines 66, 86 and adjust the outputs of the pumps 60, 82 as discussed above.

To relieve the pressure and prevent cavitation in the expanding sides of the steering cylinders 32, 34 during impact situations with the ground engaging members 20, the steering flow amplifier unit 54 may further include shock relief valves 212, 214 connecting the steering cylinder conduits 194, 196 to each other for potential flow in opposite directions, and anti-cavitation check valves 216, 218 connecting the steering cylinder conduits 194, 196, respectively, to the tank 62. When an impact with an object causes the ground engaging members 20 to turn sharply in the direction that increases the pressure at the first turn ports 198, 200 and decreases the pressure at the second turn ports 202, 204, for example, the shock relief valve 212 may open to simultaneously vent fluid from the first steering cylinder conduit 38 and provide fluid to the second steering cylinder conduit 196 after a predetermined line pressure is reached in the first steering cylinder conduit 194. At the same time, the reduced pressure in the second steering cylinder conduit 196 may force the anti-cavitation check valve 218 to draw steering fluid flowing to the tank 62 into the second steering cylinder conduit 196 and to the second turn ports 202, 204 to prevent cavitation within the steering cylinders 32, 34. In a similar manner for impacts causing the wheels to turn sharply in the opposite direction, the shock relief valve 214 opens to vent steering fluid from the second steering cylinder conduit 196 to the first steering cylinder conduit 194, and the anti-cavitation check valve 216 may open to provide steering fluid to fill the expanding cavities at the first turn ports 198, 200.

The directional control valve 190 is spring biased to a neutral position where the main steering fluid supply line 94, the amplifier pilot fluid lines 160, 162, the return line 192, the steering cylinder conduits 194, 196 and the pilot signal passages 206, 208 are all blocked from each other. When pilot fluid is discharged to the first amplifier pilot fluid line 160 by the HMU 48 or the autonomous steering control unit 56, a pilot signal in the first pilot signal passage 206 causes the spool of the directional control valve 190 move rightward as shown to a first turn position. In the first turn position, the main steering fluid supply line 94 is fluidly connected to first steering cylinder conduit 194, and the second steering cylinder conduit 196 is fluidly connected to the return line 192 and, correspondingly, to the tank 62. The pressure of the steering fluid at the first turn ports 198, 200 causes the pistons of the steering cylinders 32, 34 to move in the first turn direction as fluid on the opposite sides of the pistons drains through the second turn ports 202, 204 to the tank 62. At the same time, the first amplifier pilot fluid line 160 is fluidly connected with a variable orifice to the second pilot signal passage 208 to communicate the pilot fluid in the first amplifier pilot fluid line 160 to the second amplifier pilot fluid line 162 and drain the pilot fluid to the tank 62 through the HMU 48 or the autonomous steering control unit 56 depending on the current steering mode.

Similarly, when pilot fluid is discharged to the second amplifier pilot fluid line 162, a pilot signal in the second pilot signal passage 208 causes the spool of the directional control valve 190 move leftward to a second turn position where the main steering fluid supply line 94 is fluidly connected to second steering cylinder conduit 196, and the first steering cylinder conduit 194 is fluidly connected to the return line 192. The pressure of the steering fluid at the second turn ports 202, 204 causes the steering cylinders 32, 34 to move in the second turn direction as fluid drains through the first turn ports 198, 200 to the tank 62. The second amplifier pilot fluid line 162 is fluidly connected to the first pilot signal passage 206 with a variable orifice to drain the pilot fluid in the second amplifier pilot fluid line 162 to the tank 62 through the first amplifier pilot fluid line 160.

The autonomous steering control unit 56 will control steering of the work machine 10 in the autonomous steering mode by providing pilot fluid to amplifier pilot fluid lines 160, 162 of the steering flow amplifier unit 54 to cause the steering cylinders 32, 34 to move between the first and second turn directions in the manner described above. In the illustrated embodiment, the autonomous steering control unit 56 includes a pilot selector valve 230, a primary electro-hydraulic (EH) steering valve 232, a secondary EH steering valve 234 and an output selector valve 236. The autonomous pilot fluid lines 164, 166 and the autonomous steering primary pilot line 168 are fluidly connected to the autonomous steering control unit 56 as discussed above, as well as an autonomous steering secondary pilot line 238 that delivers pilot fluid from the secondary pilot pressure line 130 to the autonomous steering control unit 56.

Figure 3:
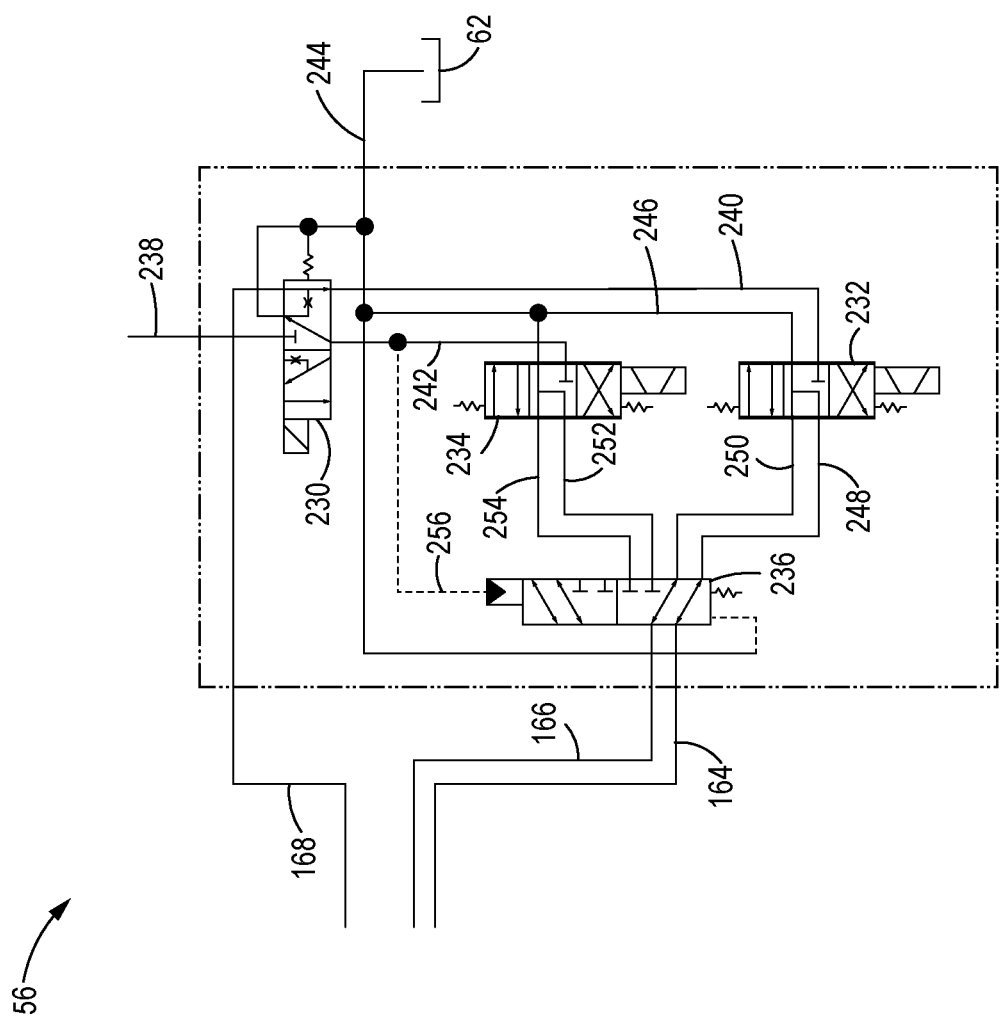
FIG. 3 is a schematic diagram of an embodiment of an autonomous steering control unit in accordance with present disclosure of the hydraulic steering control system of FIG. 1.

The autonomous steering control unit 56 in accordance with the present disclosure is illustrated in greater detail in FIG. 3. The pilot selector valve 230 has fluid connections to the primary pilot line 168 and the secondary pilot line 238 at inlet ports. The pilot selector valve 230 is fluidly connected to the primary EH steering valve 232 by a primary steering valve pilot line 240, to the secondary EH steering valve 234 by a secondary steering valve pilot line 242, and to the tank 62 by a return line 244. The pilot selector valve 230 is spring biased to a primary steering valve position where the primary EH steering valve 232 operates to provide pilot fluid to the steering flow amplifier unit 54. In the primary steering valve position, the primary pilot line 168 is fluidly connected to the primary steering valve pilot line 240 and has an orifice bleed to the return line 244. The secondary pilot line 238 is blocked, and the secondary steering valve pilot line 242 is fluidly connected to the return line 244 to drain to the tank 62. A solenoid of the pilot selector valve 230 is actuatable to move the pilot selector valve 230 to a secondary steering valve position where the secondary EH steering valve 234 operates to provide pilot fluid to the steering flow amplifier unit 54. This arrangement provides redundancy in the autonomous steering control unit 56 in the event of a failure of the primary EH steering valve 232 or the absence of pilot fluid from the primary pilot line 168. Failures of the autonomous steering control unit 56 may be detected directly based on fault detection methods such as those known in the art detecting failures of the primary EH steering valve 232, indirectly based on the failure of the steering flow amplifier unit 54 to respond as expected when steering commands are transmitted to the autonomous steering control unit 56 as indicated by, for example, sensor signals from a valve position sensor 220 operatively connected to the spool of the directional control valve 190, or by other known methods. In the secondary steering valve position, the secondary pilot line 238 is fluidly connected to the secondary steering valve pilot line 242, and the primary pilot line 168 via an orifice bleed and the primary steering valve pilot line 240 are fluidly connected to the return line 244.

The primary EH steering valve 232 is fluidly connected to the primary steering valve pilot line 240 as discussed above, and to the return line 244 by an EH steering valve drain line 246. The primary EH steering valve 232 is fluidly connected to the output selector valve 236 by a first primary-to-output selector valve pilot line 248 and a second primary-to-output selector valve pilot line 250. The primary EH steering valve 232 is spring biased to a neutral position where the primary steering valve pilot line 240 is blocked, and the primary-to-output selector valve pilot lines 248, 250 are fluidly connected to the EH steering valve drain line 246 to drain to the tank 62. The primary EH steering valve 232 further includes a dual acting solenoid that can be actuated to move a spool of the primary EH steering valve 232 from the neutral position to either a first turn position or a second turn position. When a first coil of the dual acting solenoid is charged, the spool moves downward as illustrated to the first turn position to fluidly connect the primary steering valve pilot line 240 to the first primary-to-output selector valve pilot line 248, and fluidly connected the second primary-to-output selector valve pilot line 250 to the EH steering valve drain line 246. When a second coil of the dual acting solenoid is charged, the spool moves upward to the second turn position to fluidly connect the primary steering valve pilot line 240 to the second primary-to-output selector valve pilot line 250, and fluidly connected the first primary-to-output selector valve pilot line 248 to the EH steering valve drain line 246.

The secondary EH steering valve 234 has a similar configuration as the primary EH steering valve 232 with fluid connections to the secondary steering valve pilot line 242 and the EH steering valve drain line 246. A first secondary-to-output selector valve pilot line 252 and a second secondary-to-output selector valve pilot line 254 fluidly connect the secondary EH steering valve 234 to the output selector valve 236. In a neutral position the secondary steering valve pilot line 242 is blocked and the secondary-to-output selector valve pilot lines 252, 254 are fluidly connected to the EH steering valve drain line 246. In a first turn position, the secondary steering valve pilot line 242 is fluidly connected to the first secondary-to-output selector valve pilot line 252 and the second secondary-to-output selector valve pilot line 254 is fluidly connected to the EH steering valve drain line 246. In a second turn position the secondary steering valve pilot line 242 to fluidly connect to the second secondary-to-output selector valve pilot line 254 and the first secondary-to-output selector valve pilot line 252 is fluidly connected to the EH steering valve drain line 246.

The output selector valve 236 is fluidly connected to the primary-to-output selector valve pilot lines 248, 250 and to the secondary-to-output selector valve pilot lines 252, 254 as discussed above. The output selector valve 236 is also fluidly connected to the autonomous pilot fluid lines 164, 166 to provide pilot fluid through the autonomous selector valve 50 to the amplifier pilot fluid lines 160, 162 when the work machine 10 is in the autonomous steering mode. The output selector valve 236 is spring biased to a normal primary pilot fluid output position where the primary-to-output selector valve pilot lines 248, 250 are in fluid communication with the autonomous pilot fluid lines 164, 166, respectively, and the secondary-to-output selector valve pilot lines 252, 254 are blocked. An output selector valve pilot passage 256 from the secondary steering valve pilot line 242 provides a pilot signal that can act against the biasing force to move the output selector valve 236 to a secondary pilot fluid output position when the pilot selector valve 230 is in the secondary steering valve position and providing pilot fluid to the secondary steering valve pilot line 242. In the secondary pilot fluid output position, the output selector valve 236 fluidly connects the secondary-to-output selector valve pilot lines 252, 254 to the autonomous pilot fluid lines 164, 166, respectively, and the primary-to-output selector valve pilot lines 248, 250 are blocked.

When the work machine 10 is in the manual steering mode, the solenoids of the steering mode selector valves 172, 180 are not energized so that the steering mode selector valves 172, 180 are in their closed positions and no pilot signal is communicated to the autonomous selector valve 50 from the autonomous selector valve pilot passage 170. With no pilot signal, the autonomous selector valve 50 is biased to the manual steering position and fluidly connects the HMU 48 to the steering flow amplifier unit 54 to steer the work machine 10 in response to displacement of the steering input device by an operator of the work machine 10. The autonomous selector valve 50 cuts off flow from the primary pilot pressure line 110 to the autonomous steering primary pilot line 168 and the pilot selector valve 230. The solenoids of the pilot selector valve 230 and the EH steering valves 232, 234 are not actuated so that the pilot selector valve 230 is in the primary steering valve position and the EH steering valves 232, 234 are in their neutral positions. In this normal or primary state of the autonomous steering control unit 56, the primary steering valve pilot line 240 is blocked at the primary EH steering valve 232, the autonomous steering secondary pilot line 238 is blocked at the pilot selector valve 230, and the lines 164-168, 240, 242, and 246-256 are drained to the tank 62.

When the work machine 10 is switched to the autonomous steering mode, the solenoid of the primary steering mode selector valve 172 or the secondary steering mode selector valve 180 is energized to move the corresponding steering mode selector valve 172, 180 to its open position and provide pilot fluid to the autonomous selector valve pilot passage 170 through the two-way check valve 176 and the orifice 178 to shift the autonomous selector valve 50 to the autonomous steering position and fluidly connect the autonomous pilot fluid lines 164, 166 to the amplifier pilot fluid lines 160, 162 and the primary pilot pressure line 110 to the autonomous steering primary pilot line 168. The normal or primary state of the autonomous steering control unit 56 shown in FIGS. 2 and 3 places the autonomous steering control unit 56 in condition to perform steering control via the primary EH steering valve 232. Pilot fluid from the autonomous steering primary pilot line 168 is provided through the pilot selector valve 230 to the primary steering valve pilot line 240 and the primary EH steering valve 232. Signals generated by an autonomous steering control system of the work machine 10 will actuate the dual action solenoid of the primary EH steering valve 232 to move between the neutral position and the first and second steering positions to drive the steering cylinders 32, 34 and steer the work machine 10. If a fault is detected in providing pilot fluid through the autonomous steering primary pilot line 168 or in operating the primary EH steering valve 232, that autonomous steering control system actuates the solenoid of the pilot selector valve 230 to move the pilot selector valve 230 to the secondary steering valve position to provide pilot fluid to the secondary steering valve pilot line 242 and the pilot signal to the output selector valve 236 to move to the secondary pilot fluid output position so that the secondary EH steering valve 234 is operated to drive the steering cylinders 32, 34 and steering the work machine 10.

Figure 4:
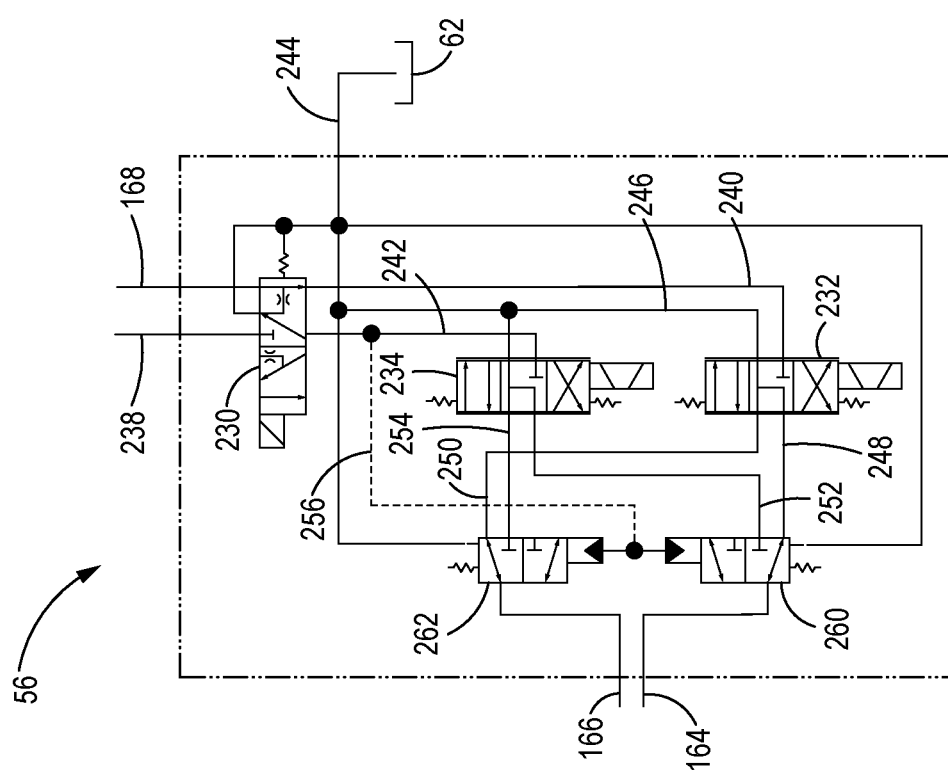
FIG. 4 is a schematic diagram of an alternative embodiment of an autonomous steering control unit in accordance with present disclosure of the hydraulic steering control system of FIG. 1.

FIG. 4 illustrates an alternative embodiment of the autonomous steering control unit 56 where the functionality of the output selector valve 236 is implemented by a first output selector valve 260 and a second output selector valve 262. In this embodiment, the first autonomous pilot fluid line 164, the first primary-to-output selector valve pilot line 248 and the first secondary-to-output selector valve pilot line 252 are fluidly connected to the first output selector valve 260, and the second autonomous pilot fluid line 166, the second primary-to-output selector valve pilot line 250 and the second secondary-to-output selector valve pilot line 254 are fluidly connected to the second output selector valve 262. The output selector valves 260, 262 are spring biased to primary pilot fluid output positions where the first primary-to-output selector valve pilot line 248 is fluidly connected to the first autonomous pilot fluid line 164, the second primary-to-output selector valve pilot line 250 is fluidly connected to the second autonomous pilot fluid line 166 and the secondary-to-output selector valve pilot lines 252, 254 are blocked. The output selector valve pilot passage 256 is fluidly connected to both output selector valves 260, 262 so that both are driven to their secondary pilot fluid output positions when the pilot selector valve 230 is activated to the secondary steering valve position and pilot fluid is communicated to the output selector valve pilot passage 256. In the secondary pilot fluid output positions, the first secondary-to-output selector valve pilot line 252 is fluidly connected to the first autonomous pilot fluid line 164, the second secondary-to-output selector valve pilot line 254 is fluidly connected to the second autonomous pilot fluid line 166 and the primary-to-output selector valve pilot lines 248, 250 are blocked. In other aspects, the embodiment of the autonomous steering control unit 56 of FIG. 4 functions substantially as described above.

Figure 5:
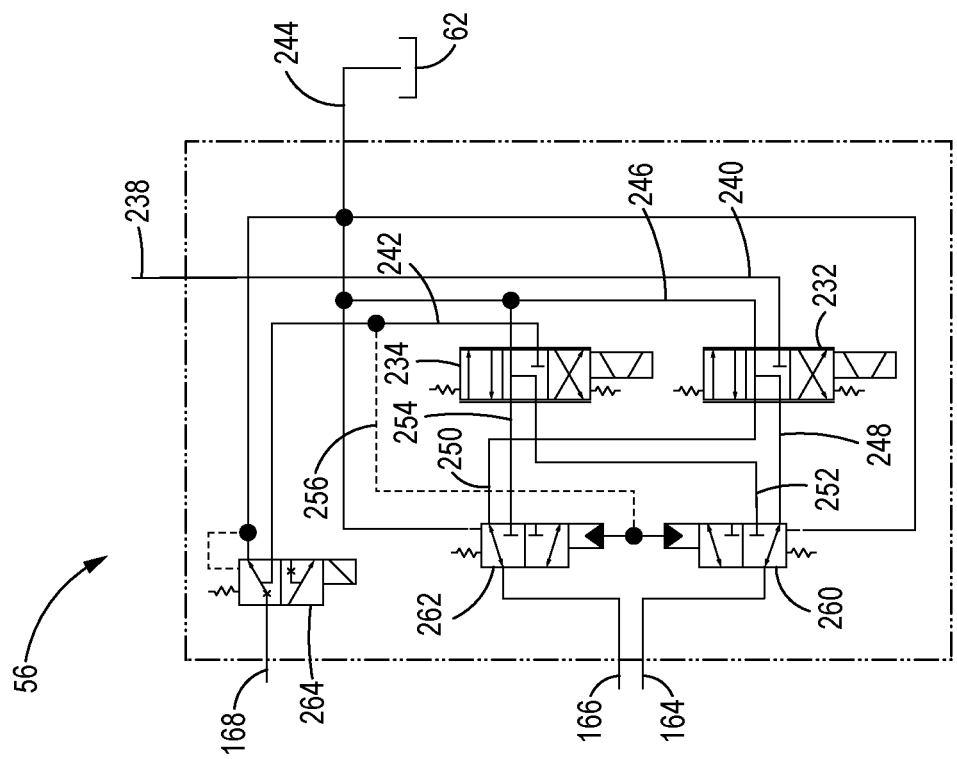
FIG. 5 is a schematic diagram of a further alternative embodiment of an autonomous steering control unit in accordance with present disclosure of the hydraulic steering control system of FIG. 1.

A further alternative embodiment of the autonomous steering control unit 56 is illustrated in FIG. 5. In this embodiment, the EH steering valve 234 is the primary steering valve and the EH steering valve 232 is the secondary steering valve, and the control logic for the autonomous steering control unit 56 is modified so that the primary EH steering valve 234 is controlled when the autonomous steering control unit 56 is operating normally, and the secondary EH steering valve 232 is controlled when a fault condition is detected during the autonomous steering mode. The pilot selector valve 230 is replaced by a primary pilot selector valve 264 that controls only the supply of pilot fluid from the autonomous steering primary pilot line 168 to the primary EH steering valve 234. The autonomous steering secondary pilot line 238 is directly connected to the secondary EH steering valve 232 to provide a constant supply of pilot fluid to the secondary EH steering valve 232 without an intervening selection valve. The primary pilot selector valve 264 is spring biased to a primary steering valve disable position where the autonomous steering primary pilot line 168 and the primary steering valve pilot line 242 are fluidly connected to the return line 244 to drain to the tank 62.

The change in the designations of the EH steering valves 232, 234 is due to a logic change with the primary selector valve 264 where a solenoid of the primary selector valve 264 is actuated to move the primary selector valve 264 to a primary steering valve enable position to enable the primary steering mode of the autonomous steering control unit 56, and the solenoid is de-actuated to allow the primary selector valve 264 to move under the biasing force to the primary steering valve disable position to enable the secondary steering mode of the autonomous steering control unit 56. The solenoid of the primary pilot selector valve 264 is actuated to move the primary pilot selector valve 264 to the primary steering valve enable position to fluidly connect the autonomous steering primary pilot line 168 to the primary steering valve pilot line 242, and to create the pilot signal in the output selector valve pilot passage 256 to move the output selector valves 260, 262 to their primary pilot fluid output positions. As with the embodiment of FIG. 4, the embodiment of the autonomous steering control unit 56 of FIG. 5 functions substantially as described above in connection with FIGS. 2 and 3 in other aspects. Moreover, while the primary pilot selector valve 264 is implemented with the output selector valves 260, 262 in the embodiment of FIG. 5, those skilled in the art will understand that the primary pilot selector valve 264 may be substituted for the pilot selector valve 230 in the embodiment of FIGS. 2 and 3 and implemented in a similar manner with the output selector valve 236. As a further alternative where the control logic for the EH steering valves 232, 234 is the same as in the previously-discussed embodiments, the primary pilot selector valve 264 is fluidly connected to the primary steering valve pilot line 240 and the primary EH steering valve 232, and the autonomous steering primary pilot line 238 is directly connected to the secondary EH steering valve 234. To operate with the primary pilot selector valve 264 as discussed above, the output selector valve pilot passage 256 in this embodiment would be connected between the primary steering valve pilot line 240 and the output selector valve 260, 262, and the connections of the first selector valve pilot lines 248, 252 to the first output selector valve 260 and the connections of the second selector valve pilot lines 250, 254 to the second output selector valve 262 would be reversed.

Figure 6:
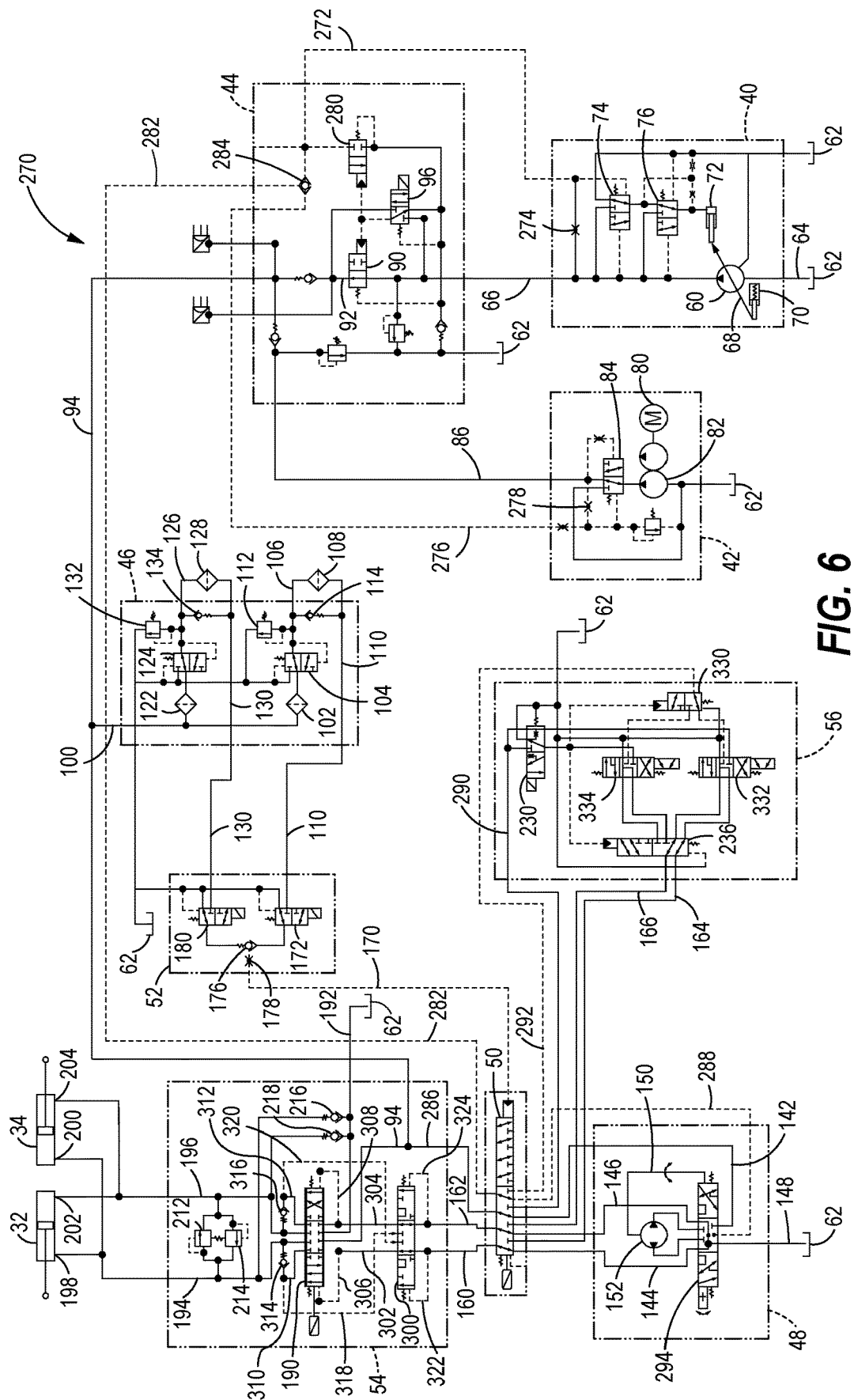
FIG. 6 is a schematic diagram of an alternative embodiment of a hydraulic steering control system in accordance with the present disclosure of the work machine of FIG. 1.

FIG. 6 illustrates an alternative embodiment of a hydraulic steering control system 270 utilizing dynamic load sensing to control the fluid output by the steering fluid supply units 40, 42 to the other components of the hydraulic steering control system 270. In the primary steering fluid supply unit 40, the primary pump discharge line 66 is fluidly connected to a dynamic load sense line 272 by an orifice 274 that reduces the fluid pressure to the dynamic load sense line 272 from the fluid pressure in the primary pump discharge line 66. The dynamic load sense line 272 also provides a pressure signal to the supply pressure regulator valve 74 acting against the pressure in the primary pump discharge line 66 to control the supply pressure regulator valve 74 to adjust the output of the primary pump 60 as described above. Similarly in the secondary steering fluid supply unit 42, the secondary pump discharge line 86 is fluidly connected to a secondary dynamic load sense line 276 by an orifice 278 to control the supply pressure regulator valve 84 to adjust the output of the secondary pump 82.

The steering disable unit 44 is modified to divert the load sense fluid in the dynamic load sense line 272 from the downstream components of the hydraulic steering control system 270 when the steering disable control valve 96 is energized to cut off the flow in the primary pump discharge line 66. A load sense drain valve 280 is connected between the dynamic load sense line 272 and the tank 62. The load sense drain valve 280 is spring biased to a closed position where the dynamic load sense line 272 is blocked from the tank 62 and the dynamic load sense fluid can be combined with load sense fluid from the secondary dynamic load sense line 276 into a main load sense line 282 at a two-way check valve 284 and communicated to the autonomous selector valve 50. Similar to the primary fluid supply cutoff valve 90, the load sense drain valve 280 receives the pilot signal from the steering disable control valve 96 at a pilot end. When the steering disable control valve moves to the disable position, the pilot signal causes the load sense drain valve 280 to move to an open position to fluidly connect the primary dynamic load sense line 272 to the tank 62 to drain.

The pilot supply unit 46 and the steering mode selector unit 52 are generally configured as discussed above for the hydraulic steering control system 30, except the pilot fluid is provided to the steering mode selector unit 52 only, and not to the HMU 48, the steering flow amplifier unit 54 and the autonomous steering control unit 56. Instead, the pilot pressure lines 110, 130 are fluidly connected to the steering mode selector valves 172, 180, respectively, of the steering mode selector unit 52. The pilot fluid for the HMU 48, the steering flow amplifier unit 54 and the autonomous steering control unit 56 is supplied from the main steering fluid supply line 94 through a pilot fluid supply line 286 to the autonomous selector valve 50. The autonomous selector valve 50 has generally the same configuration as previous described. In the manual steering position, the autonomous selector valve 50 fluidly connects the pilot fluid supply line 286 to the manual pilot supply line 142, and fluidly connects the main load sense line 282 to a manual load sense line 288. When the solenoid of the primary steering mode selector valve 172 or the secondary steering mode selector valve 180 is actuated to move the autonomous selector valve 50 to the autonomous steering position, the pilot fluid supply line 286 is fluidly connected to an autonomous pilot supply line 290, and the main load sense line 282 is fluidly connected to an autonomous load sense line 292.

In the HMU 48, a steering control valve 294 has a generally similar configuration as the steering control valve 140 illustrated and described above, but has an additional fluid connection to the manual load sense line 288. In the neutral position, the manual load sense line 288 is fluidly connected to the return line 148 to maintain fluid flow in the load sense lines 272, 276, 282 by draining to the tank 62. In either of the turn positions of the steering control valve 294, the load sense fluid from the manual load sense line 288 is merged with the pilot fluid from the manual pilot supply line 142 and communicated through the metering mechanism 152 to the corresponding one of the manual pilot lines 144, 146. With these connections, the pressure of the pilot fluid in the steering flow amplifier unit 54 will be communicated back through the load sense lines 272, 276, 282, 288 to control the steering fluid flow from the steering fluid supply units 40, 42.

The steering flow amplifier unit 54 is modified for the use of metered steering fluid from the main steering fluid supply line 94 to control the movement of the directional control valve 190. The steering flow amplifier unit 54 as shown includes a selector valve 300 installed between the amplifier pilot fluid lines 160, 162 and the directional control valve 190. Control fluid passages 302, 304 may extend between the selector valve 300 and the directional control valve 190. Pilot passages 306, 308 fluidly connect the control fluid passages 302, 304 with opposite ends of the directional control valve 190. Fluid combiner passages 310, 312 from the directional control valve 190 are fluidly connected to the steering cylinder conduits 194, 196, respectively, through check valves 314, 316. Signal passages 318, 320 fluidly connect the fluid combiner passages 310, 312, respectively, with the directional control valve 190. Another pair of pilot passages 322, 324 may individually connect the amplifier pilot fluid lines 160, 162 with opposite ends of the selector valve 300. The directional control valve 190 is moveable between a neutral position and right and left turn positions as described above. At the turn positions, a plurality of infinitely variable flow paths are established between the various fluid lines and passages. The operation of the steering flow amplifier unit 54 with the directional control valve 190 and the selector valve 300 to steer a work machine 10 in response to fluid provided through the amplifier pilot fluid lines 160, 162 is described in detail in U.S. Pat. No. 9,878,737, issued to McIlheran et al. on Jan. 30, 2018, entitled "Hydraulic Steering Control System," which is expressly incorporated by reference herein.

The autonomous steering control unit 56 in the hydraulic steering control system 270 is modified to route the steering fluid from the autonomous pilot supply line 290 to the autonomous pilot fluid lines 164, 166 to steer the work machine 10 and to maintain flow of load sense fluid through the dynamic load sense lines 272, 276, 282, 292. In the autonomous steering control unit 56 of the hydraulic steering control system 270 as shown, the pilot selector valve 230 and the output selector valve 236 are configured essentially as described above. In alternative embodiments, the pilot selector valve 264 of FIG. 5 and/or the output selector valves 260, 262 of FIGS. 4 and 5 may be substituted for the pilot selector valve 230 and the output selector valve 336, respectively, as illustrated and described above.

Figure 7:
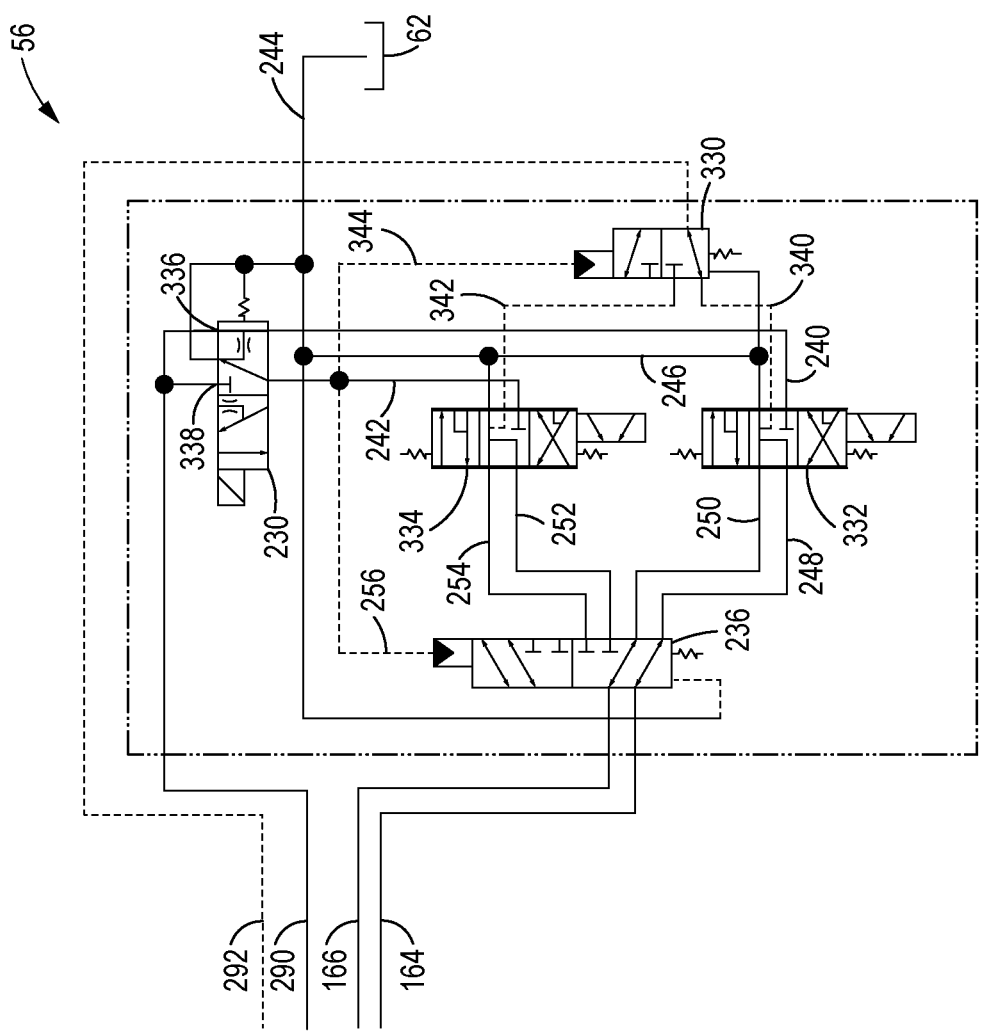
FIG. 7 is a schematic diagram of an embodiment of an autonomous steering control unit in accordance with present disclosure of the hydraulic steering control system of FIG. 6.

The autonomous steering control unit 56 as illustrated includes a load sense selector valve 330 that is fluidly connected to the autonomous load sense line 292. The autonomous steering control unit 56 further includes a primary EH steering valve 332 and a secondary EH steering valve 334 that control the flow of the load sense fluid to the autonomous pilot fluid lines 164, 166 as described further hereinafter. The autonomous steering control unit 56 is accordance with the alternative embodiment is shown in greater detail in FIG. 7. The autonomous steering control unit 56 has a single source of pilot fluid provided by the autonomous pilot supply line 290. The autonomous pilot supply line 290 is split at the pilot selector valve 230 and fluidly connected to both a primary pilot fluid port 336 and a secondary pilot fluid port 338 of the pilot selector valve 230. In the primary steering valve position as described above, the primary pilot fluid port 336 is fluidly connected to the primary steering valve pilot line 240 and the secondary pilot fluid port 338 is blocked. In the secondary steering valve position, the secondary pilot fluid port 338 is fluidly connected to the secondary steering valve pilot line 242 and the primary pilot fluid port 336 is blocked.

The EH steering valves 332, 334 have generally similar configurations as the EH steering valves 232, 234 illustrated and described above, but have additional fluid connections to the load sense selector valve 330. A primary load sense fluid line 340 fluidly connects the load sense selector valve 330 to the primary EH steering valve 332, and a secondary load sense fluid line 342 fluidly connects the load sense selector valve 330 to the secondary EH steering valve 334. The load sense selector valve 330 is spring biased to a normal primary load sense fluid output position where the autonomous load sense line 292 is in fluid communication with the primary load sense fluid line 340, and the secondary load sense fluid line 342 is blocked. A second output selector valve pilot passage 344 from the secondary steering valve pilot line 242 provides a pilot signal that can act against the biasing force to move the load sense selector valve 330 to a secondary load sense fluid output position when the pilot selector valve 230 is in the secondary steering valve position and providing pilot fluid to the secondary steering valve pilot line 242. In the secondary load sense fluid output position, the load sense selector valve 330 fluidly connects the autonomous load sense line 292 to the secondary load sense fluid line 342, and the primary load sense fluid line 340 is blocked.

The EH steering valves 332, 334 are spring biased to neutral positions, and have dual action solenoids that are actuatable by the autonomous steering controller to move the EH steering valves 332, 334 between first and second turn positions. The fluid connections provided by the EH steering valves 332, 334 between the steering valve pilot lines 240, 242, the EH steering valve drain line 246 and the selector valve pilot lines 248, 250, 252, 254 in the neutral and turn positions may be the same as the EH steering valves 232, 234 discussed above to transfer fluid to the autonomous pilot fluid lines 164, 166 and steer the work machine 10. The EH steering valves 332, 334 differ in the additional fluid connections for the load sense fluid lines 340, 342. In the neutral positions, the load sense fluid lines 340, 342 are fluidly connected to the EH steering valve drain line 246 to maintain fluid flow in the load sense lines 272, 276, 282, 292 by draining to the tank 62. In either of the turn positions of the EH steering valves 332, 334, the load sense fluid from the load sense fluid lines 340, 342 is merged with the pilot fluid from the steering valve pilot lines 240, 242 and communicated through the EH steering valves 332, 334 and the output selector valve 236 to the autonomous pilot fluid lines 164, 166. With these connections, the pressure of the pilot fluid in the steering flow amplifier unit 54 will be communicated back through the load sense lines 272, 276, 282, 292 to control the steering fluid flow from the steering fluid supply units 40, 42.

INDUSTRIAL APPLICABILITY

The hydraulic steering control systems 30, 270 in accordance with the present disclosure provide redundancy in the operation of the autonomous steering control units 56 that is scalable for implementation in work machines 10 having varying sizes and fluid flow requirements. Some existing electro-hydraulic steering valves with redundant actuation output too much fluid flow for piloting smaller steering flow amplification units 54. Such steering valves are often cast body spool valves generating high fluid flows that are too high for smaller work machines 10, and the valves may not be capable of fine adjustment necessary to closely control the steering of the smaller work machine.

The autonomous steering control units 56 are adaptable for use in varying sizes of work machines 10. The autonomous steering control units 56 may be implemented using cartridge-type valves as the EH steering valves 232, 234, 332, 334 that are scalable to produce the flow rates required for work machines 10 of a given size. Redundancy is obtained by using the pairs of EH steering valves 232, 234 and 332, 334 and selecting between the valves to ensure fluid flow to the steering flow amplifier unit 54 during the autonomous steering mode. Two (FIGS. 2-5) or three (FIGS. 6 and 7) selector valves are needed around the EH steering valves 232, 234 and 332, 334 to support redundant operation of the autonomous steering control unit 56. Complexity and cost may be reduced with the pilot selector valves 230, 264 being EH actuated to alternate between the primary and secondary steering valve positions, and the output selector valves 236, 260, 262 and the load sense selector valve 330 being piloted by the pilot selector valves 230, 264 based on the position of the pilot selector valves 230, 264 and the flow of pilot fluid therefrom.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. An autonomous steering control unit for a hydraulic steering control system for a work machine, wherein the hydraulic steering control system has a primary pilot line, a secondary pilot line, a first autonomous pilot fluid line and a second autonomous pilot fluid line, the autonomous steering control unit comprising:
   a pilot selector valve fluidly connected to the secondary pilot line and a return line to a fluid reservoir;
   a primary electro-hydraulic (EH) steering valve fluidly connected to the primary pilot line and the return line;
   a secondary EH steering valve fluidly connected to the pilot selector valve and the return line; and
   an output selector valve fluidly connected to the primary EH steering valve, the secondary EH steering valve, the first autonomous pilot fluid line and the second autonomous pilot fluid line,
   wherein, in a primary autonomous steering mode of the autonomous steering control unit, the pilot selector valve is biased to a primary steering valve position where the secondary pilot line is fluidly connected to the return line, the output selector valve is biased to a primary pilot fluid output position where the primary EH steering valve is fluidly connected to the first autonomous pilot fluid line and the second autonomous pilot fluid line, and the primary EH steering valve is actuatable between a primary valve neutral position where the primary pilot line is blocked and the first autonomous pilot fluid line and the second autonomous pilot fluid line are fluidly connected to the return line, a primary valve first turn position where the primary pilot line is fluidly connected to the first autonomous pilot fluid line, and a primary valve second turn position where the primary pilot line is fluidly connected to the second autonomous pilot fluid line, and
   wherein, in a secondary autonomous steering mode of the autonomous steering control unit, the pilot selector valve is actuated to a secondary steering valve position where the secondary pilot line is fluidly connected to the secondary EH steering valve, the output selector valve is forced by fluid from the secondary pilot line to a secondary pilot fluid output position where the secondary EH steering valve is fluidly connected to the first autonomous pilot fluid line and the second autonomous pilot fluid line, and the secondary EH steering valve is actuatable between a secondary valve neutral position where the secondary pilot line is blocked and the first autonomous pilot fluid line and the second autonomous pilot fluid line are fluidly connected to the return line, a secondary valve first turn position where the secondary pilot line is fluidly connected to the first autonomous pilot fluid line and the second autonomous pilot fluid line is fluidly connected to the return line, and a secondary valve second turn position where the secondary pilot line is fluidly connected to the second autonomous pilot fluid line.

2. The autonomous steering control unit of claim 1, wherein the output selector valve comprises:
   a first output selector valve fluidly connecting the primary EH steering valve and the secondary EH steering valve to the first autonomous pilot fluid line; and
   a second output selector valve fluidly connecting the primary EH steering valve and the secondary EH steering valve to the second autonomous pilot fluid line,
   wherein, in the primary autonomous steering mode of the autonomous steering control unit, the first output selector valve is biased to the primary pilot fluid output position where the primary EH steering valve is fluidly connected to the first autonomous pilot fluid line, and the second output selector valve is biased to the primary pilot fluid output position where the primary EH steering valve is fluidly connected to the second autonomous pilot fluid line, and
   wherein, in the secondary autonomous steering mode of the autonomous steering control unit, the first output selector valve is forced by fluid from the secondary pilot line to the secondary pilot fluid output position where the secondary EH steering valve is fluidly connected to the first autonomous pilot fluid line, and the second output selector valve is forced by fluid from the secondary pilot line to the secondary pilot fluid output position where the secondary EH steering valve is fluidly connected to the second autonomous pilot fluid line.

3. The autonomous steering control unit of claim 1, wherein the primary pilot line is fluidly connected to the pilot selector valve and the pilot selector valve is fluidly connected to the primary EH steering valve, wherein, in the primary autonomous steering mode, the pilot selector valve fluidly connects the primary pilot line to the primary EH steering valve, and wherein, in the secondary autonomous steering mode, the pilot selector valve fluidly connects the primary EH steering valve to the return line.

4. The autonomous steering control unit of claim 3, wherein the output selector valve comprises:
   a first output selector valve fluidly connecting the primary EH steering valve and the secondary EH steering valve to the first autonomous pilot fluid line; and
   a second output selector valve fluidly connecting the primary EH steering valve and the secondary EH steering valve to the second autonomous pilot fluid line,
   wherein, in the primary autonomous steering mode of the autonomous steering control unit, the first output selector valve is biased to the primary pilot fluid output position where the primary EH steering valve is fluidly connected to the first autonomous pilot fluid line, and the second output selector valve is biased to the primary pilot fluid output position where the primary EH steering valve is fluidly connected to the second autonomous pilot fluid line, and
   wherein, in the secondary autonomous steering mode of the autonomous steering control unit, the first output selector valve is forced by fluid from the secondary pilot line to the secondary pilot fluid output position where the secondary EH steering valve is fluidly connected to the first autonomous pilot fluid line, and the second output selector valve is forced by fluid from the secondary pilot line to the secondary pilot fluid output position where the secondary EH steering valve is fluidly connected to the second autonomous pilot fluid line.

5. The autonomous steering control unit of claim 1, wherein, in the primary autonomous steering mode of the autonomous steering control unit, the second autonomous pilot fluid line is fluidly connected to the return line when the primary EH steering valve is in the primary valve first turn position and the first autonomous pilot fluid line is fluidly connected to the return line when the primary EH steering valve is in the primary valve second turn position, and wherein, in the secondary autonomous steering mode of the autonomous steering control unit, and wherein, in the secondary autonomous steering mode of the autonomous steering control unit, the second autonomous pilot fluid line is fluidly connected to the return line when the secondary EH steering valve is in the secondary valve first turn position and the first autonomous pilot fluid line is fluidly connected to the return line when the secondary EH steering valve is in the secondary valve second turn position.

6. The autonomous steering control unit of claim 1, wherein the primary EH steering valve comprises a primary dual action solenoid that is actuatable to move the primary EH steering valve to the primary valve first turn position and the primary valve second turn position, and the secondary EH steering valve comprises a secondary dual action solenoid that is actuatable to move the secondary EH steering valve to the secondary valve first turn position and the secondary valve second turn position.

7. The autonomous steering control unit of claim 1, wherein the primary pilot line is connected directly to the primary EH steering valve.

8. An autonomous steering control unit for a hydraulic steering control system for a work machine, wherein the hydraulic steering control system has a primary pilot line, a secondary pilot line, a first autonomous pilot fluid line and a second autonomous pilot fluid line, the autonomous steering control unit comprising:
   a primary pilot selector valve fluidly connected to the primary pilot line and a return line to a fluid reservoir;
   a primary electro-hydraulic (EH) steering valve fluidly connected to the pilot selector valve and the return line;
   a secondary EH steering valve fluidly connected to the secondary pilot line and the return line; and
   an output selector valve fluidly connected to the primary EH steering valve, the secondary EH steering valve, the first autonomous pilot fluid line and the second autonomous pilot fluid line,
   wherein, in a primary autonomous steering mode of the autonomous steering control unit, the primary pilot selector valve is actuated to a primary steering valve enable position where the primary pilot line is fluidly connected to the primary EH steering valve, the output selector valve is forced by fluid from the primary pilot line to a primary pilot fluid output position where the primary EH steering valve is fluidly connected to the first autonomous pilot fluid line and the second autonomous pilot fluid line, and the primary EH steering valve is actuatable between a primary valve neutral position where the primary pilot line is blocked and the first autonomous pilot fluid line and the second autonomous pilot fluid line are fluidly connected to the return line, a primary valve first turn position where the primary pilot line is fluidly connected to the first autonomous pilot fluid line, and a primary valve second turn position where the primary pilot line is fluidly connected to the second autonomous pilot fluid line, and
   wherein, in a secondary autonomous steering mode of the autonomous steering control unit, the primary pilot selector valve is biased to a primary steering valve disable position where the primary pilot line is fluidly connected to the return line, the output selector valve is biased to a secondary pilot fluid output position where the secondary EH steering valve is fluidly connected to the first autonomous pilot fluid line and the second autonomous pilot fluid line, and the secondary EH steering valve is actuatable between a secondary valve neutral position where the secondary pilot line is blocked and the first autonomous pilot fluid line and the second autonomous pilot fluid line are fluidly connected to the return line, a secondary valve first turn position where the secondary pilot line is fluidly connected to the first autonomous pilot fluid line and the second autonomous pilot fluid line is fluidly connected to the return line, and a secondary valve second turn position where the secondary pilot line is fluidly connected to the second autonomous pilot fluid line.

9. The autonomous steering control unit of claim 8, wherein the output selector valve comprises:
   a first output selector valve fluidly connecting the primary EH steering valve and the secondary EH steering valve to the first autonomous pilot fluid line; and
   a second output selector valve fluidly connecting the primary EH steering valve and the secondary EH steering valve to the second autonomous pilot fluid line,
   wherein, in the primary autonomous steering mode of the autonomous steering control unit, the first output selector valve is forced by fluid from the primary pilot line to the primary pilot fluid output position where the primary EH steering valve is fluidly connected to the first autonomous pilot fluid line, and the second output selector valve is forced by fluid from the primary pilot line to the primary pilot fluid output position where the primary EH steering valve is fluidly connected to the second autonomous pilot fluid line, and
   wherein, in the secondary autonomous steering mode of the autonomous steering control unit, the first output selector valve is biased to the secondary pilot fluid output position where the secondary EH steering valve is fluidly connected to the first autonomous pilot fluid line, and the second output selector valve is biased to the secondary pilot fluid output position where the secondary EH steering valve is fluidly connected to the second autonomous pilot fluid line.

10. The autonomous steering control unit of claim 8, wherein the primary pilot selector valve is fluidly connected to the output selector valve by an output selector valve pilot passage, and wherein, in the primary autonomous steering mode, the primary pilot selector valve fluidly connects the primary pilot line to the output selector valve to force the output selector valve to the primary pilot fluid output position.

11. The autonomous steering control unit of claim 10, wherein, in the secondary autonomous steering mode, the primary pilot selector valve fluidly connects the output selector valve pilot passage to the return line to allow the output selector valve to be biased to the secondary pilot fluid output position.

12. The autonomous steering control unit of claim 8, wherein, in the primary autonomous steering mode of the autonomous steering control unit, the second autonomous pilot fluid line is fluidly connected to the return line when the primary EH steering valve is in the primary valve first turn position and the first autonomous pilot fluid line is fluidly connected to the return line when the primary EH steering valve is in the primary valve second turn position, and wherein, in the secondary autonomous steering mode of the autonomous steering control unit, and wherein, in the secondary autonomous steering mode of the autonomous steering control unit, the second autonomous pilot fluid line is fluidly connected to the return line when the secondary EH steering valve is in the secondary valve first turn position and the first autonomous pilot fluid line is fluidly connected to the return line when the secondary EH steering valve is in the secondary valve second turn position.

13. The autonomous steering control unit of claim 8, wherein the primary EH steering valve comprises a primary dual action solenoid that is actuatable to move the primary EH steering valve to the primary valve first turn position and the primary valve second turn position, and the secondary EH steering valve comprises a secondary dual action solenoid that is actuatable to move the secondary EH steering valve to the secondary valve first turn position and the secondary valve second turn position.

14. An autonomous steering control unit for a hydraulic steering control system for a work machine, wherein the hydraulic steering control system has a pilot supply line, a load sense line, a first autonomous pilot fluid line and a second autonomous pilot fluid line, the autonomous steering control unit comprising:
a pilot selector valve fluidly connected to the pilot supply line and a return line to a fluid reservoir;
a load sense selector valve fluidly connected to the load sense line;
a primary electro-hydraulic (EH) steering valve fluidly connected to the load sense selector valve, the pilot supply line and the return line;
a secondary EH steering valve fluidly connected to the load sense selector valve, the pilot selector valve and the return line; and
an output selector valve fluidly connected to the primary EH steering valve, the secondary EH steering valve, the first autonomous pilot fluid line and the second autonomous pilot fluid line,
wherein, in a primary autonomous steering mode of the autonomous steering control unit, the pilot selector valve is biased to a primary steering valve position where the pilot supply line is not fluidly connected to the secondary EH steering valve, the load sense selector valve is biased to a primary load sense fluid output position where the load sense line is fluidly connected to the primary EH steering valve and is not fluidly connected to the secondary EH steering valve, the output selector valve is biased to a primary pilot fluid output position where the primary EH steering valve is fluidly connected to the first autonomous pilot fluid line and the second autonomous pilot fluid line, and the primary EH steering valve is actuatable between a primary valve neutral position where the pilot supply line is blocked and the first autonomous pilot fluid line, the second autonomous pilot fluid line and the load sense line are fluidly connected to the return line, a primary valve first turn position where the load sense line is fluidly connected to the pilot supply line and the pilot supply line is fluidly connected to the first autonomous pilot fluid line, and a primary valve second turn position where the load sense line is fluidly connected to the pilot supply line and the pilot supply line is fluidly connected to the second autonomous pilot fluid line, and
wherein, in a secondary autonomous steering mode of the autonomous steering control unit, the pilot selector valve is actuated to a secondary steering valve position where the pilot supply line is fluidly connected to the secondary EH steering valve, the load sense selector valve is forced by fluid from the pilot supply line to a secondary load sense fluid output position where the load sense line is fluidly connected to the secondary EH steering valve and is not fluidly connected to the primary EH steering valve, the output selector valve is forced by fluid from the pilot supply line to a secondary pilot fluid output position where the secondary EH steering valve is fluidly connected to the first autonomous pilot fluid line and the second autonomous pilot fluid line, and the secondary EH steering valve is actuatable between a secondary valve neutral position where the pilot supply line is blocked and the first autonomous pilot fluid line and the second autonomous pilot fluid line are fluidly connected to the return line, a secondary valve first turn position where the load sense line is fluidly connected to the pilot supply line and the pilot supply line is fluidly connected to the first autonomous pilot fluid line, and a secondary valve second turn position where the load sense line is fluidly connected to the pilot supply line and the pilot supply line is fluidly connected to the second autonomous pilot fluid line.

15. The autonomous steering control unit of claim 14, wherein the output selector valve comprises:
a first output selector valve fluidly connecting the primary EH steering valve and the secondary EH steering valve to the first autonomous pilot fluid line; and
a second output selector valve fluidly connecting the primary EH steering valve and the secondary EH steering valve to the second autonomous pilot fluid line,
wherein, in the primary autonomous steering mode of the autonomous steering control unit, the first output selector valve is biased to the primary pilot fluid output position where the primary EH steering valve is fluidly connected to the first autonomous pilot fluid line, and the second output selector valve is biased to the primary pilot fluid output position where the primary EH steering valve is fluidly connected to the second autonomous pilot fluid line, and
wherein, in the secondary autonomous steering mode of the autonomous steering control unit, the first output selector valve is forced by fluid from the pilot supply line to the secondary pilot fluid output position where the secondary EH steering valve is fluidly connected to the first autonomous pilot fluid line, and the second output selector valve is forced by fluid from the pilot supply line to the secondary pilot fluid output position where the secondary EH steering valve is fluidly connected to the second autonomous pilot fluid line.

16. The autonomous steering control unit of claim 14, wherein the pilot supply line is fluidly connected to the pilot selector valve at a primary pilot fluid port and a secondary pilot fluid port, and the pilot selector valve is fluidly connected to the primary EH steering valve, wherein, in the primary autonomous steering mode, the pilot selector valve fluidly connects the primary pilot fluid port to the primary EH steering valve and does not fluidly connect the secondary pilot fluid port to the secondary EH steering valve, and wherein, in the secondary autonomous steering mode, the pilot selector valve fluidly connects the secondary pilot fluid port to the secondary EH steering valve and does not fluidly connect the primary pilot fluid port to the primary EH steering valve.

17. The autonomous steering control unit of claim 16, wherein the output selector valve comprises:
a first output selector valve fluidly connecting the primary EH steering valve and the secondary EH steering valve to the first autonomous pilot fluid line; and a second output selector valve fluidly connecting the primary EH steering valve and the secondary EH steering valve to the second autonomous pilot fluid line, wherein, in the primary autonomous steering mode of the autonomous steering control unit, the first output selector valve is biased to the primary pilot fluid output position where the primary EH steering valve is fluidly connected to the first autonomous pilot fluid line, and the second output selector valve is biased to the primary pilot fluid output position where the primary EH steering valve is fluidly connected to the second autonomous pilot fluid line, and wherein, in the secondary autonomous steering mode of the autonomous steering control unit, the first output selector valve is forced by fluid from the pilot supply line to the secondary pilot fluid output position where the secondary EH steering valve is fluidly connected to the first autonomous pilot fluid line, and the second output selector valve is forced by fluid from the pilot supply line to the secondary pilot fluid output position where the secondary EH steering valve is fluidly connected to the second autonomous pilot fluid line.

18. The autonomous steering control unit of claim 14, wherein, in the primary autonomous steering mode of the autonomous steering control unit, the second autonomous pilot fluid line is fluidly connected to the return line when the primary EH steering valve is in the primary valve first turn position and the first autonomous pilot fluid line is fluidly connected to the return line when the primary EH steering valve is in the primary valve second turn position, and wherein, in the secondary autonomous steering mode of the autonomous steering control unit, and wherein, in the secondary autonomous steering mode of the autonomous steering control unit, the second autonomous pilot fluid line is fluidly connected to the return line when the secondary EH steering valve is in the secondary valve first turn position and the first autonomous pilot fluid line is fluidly connected to the return line when the secondary EH steering valve is in the secondary valve second turn position.

19. The autonomous steering control unit of claim 14, wherein the primary EH steering valve comprises a primary dual action solenoid that is actuatable to move the primary EH steering valve to the primary valve first turn position and the primary valve second turn position, and the secondary EH steering valve comprises a secondary dual action solenoid that is actuatable to move the secondary EH steering valve to the secondary valve first turn position and the secondary valve second turn position.

20. The autonomous steering control unit of claim 14, wherein the pilot supply line is connected directly to the primary EH steering valve.

* * * * *